United States Patent Office 2,866,766
Patented Dec. 30, 1958

2,866,766

SOLUTIONS OF PERFLUOROCHLOROOLEFIN COPOLYMERS

Francis J. Honn, Westfield, N. J., assignor, by mesne assignments, to Minnesota Mining and Manufacturing Company, St. Paul, Minn., a corporation of Delaware No Drawing. Application September 16, 1954
Serial No. 456,611

11 Claims. (Cl. 260—30.4)

This invention relates to copolymers of perfluorochloroolefins. In one of its aspects this invention relates to solvents and solutions of copolymers of perfluorochloroolefins.

Copolymers of the perfluorochloroolefins possess remarkable chemical resistance, good electrical properties and high thermal stability. Their chemical properties are such that they can be used as protective barriers against the effects of highly corrosive chemical reagents. Thus, these copolymers have great utility as protective coatings on metal surfaces, such as in the lining of tanks, and on fabric surfaces, such as in protective clothing applications. Because of their good electrical properties these copolymers are useful as wire coating, insulation, etc. Their high thermal stability is such that they can be exposed to relatively high temperatures for prolonged periods of time without deleterious effects.

In addition to their high degree of chemical stability, these copolymers are also resistant to the solvent action of most organic solvents. For example, these copolymers are insoluble in aliphatic, aromatic and chlorinated hydrocarbons and in alcohols. The insolubility of these copolymers has seriously limited their use to applications where they could be applied in either film form or from dispersions.

It is an object of this invention to provide solvents for copolymers of the perfluorochloroolefins.

It is another object of this invention to provide a process for preparing useful copolymeric perfluorochloroolefin solutions.

It is another object of this invention to provide solutions of copolymers of perfluorochloroolefins, such as copolymers of trifluorochloroethylene which may be used in coating applications.

Various other objects and advantages of the present invention will become apparent to those skilled in the art on reading the accompanying description and disclosure.

In general, solutions of the perfluorochloroolefin copolymers are prepared by dissolving the copolymer in a cyclic ether. The cyclic ethers have surprisingly been discovered to possess remarkable solvent power for these copolymers. These solvents, additionally, permit depositing a uniform homogeneous coating on a variety of surfaces, e. g., metal, fabric, polymer, etc. without the need for high temperatures which must be used when the copolymer is applied in the form of a dispersion or film.

The copolymers of the perfluorochloroolefins which form the solute phase of the solutions of this invention, are prepared by copolymerizing perfluorochloroolefins, such as dichlorodifluoroethylene (symmetrical and unsymmetrical) and trifluorochloroethylene with other halogenated olefins. These other halogenated olefins are copolymerizable with the perfluorochloroolefins and contain at least one hydrogen atom in the molecule, preferably at least two hydrogen atoms and include compounds, such as vinyl chloride, vinylidene chloride, vinyl fluoride, vinylidene fluoride, 1,1-fluorochloroethylene and trifluoroethylene.

Of the copolymers described above, those prepared by copolymerizing trifluorochloroethylene with vinylidene fluoride have been found to possess generally superior characteristics in a wider field of utility. Hence, this invention will be illustrated by particular reference to this copolymer system, although it should be understood that the solvents of this invention are applicable to other copolymer systems as described above which are prepared by employing equivalent polymerization recipes.

The copolymers which form the solute phase of this invention are prepared by the procedure given below, in the examples, using the indicated water-suspension type recipe.

EXAMPLE I

| | Parts by weight |
|---|---|
| Water, distilled | 200.0 |
| $CF_2=CFCl$ | [1] 92.2 |
| $CF_2=CH_2$ | [1] 7.8 |
| $(NH_4)_2S_2O_8$ | 2.0 |
| $Na_2S_2O_5$ | 0.8 |
| $FeSO_4 \cdot 7H_2O$ | 0.2 |

[1] 86/14 molar.

Catalyst and activator solution was prepared by dissolving 2 parts of $(NH_4)_2S_2O_8$ in 20 parts of water. Next, 0.8 part of $Na_2S_2O_5$ were dissolved in another 20 parts of water. In still another 20 parts of water, 0.2 part of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $$FeSO_4.7H_2O$$

solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$, combined in the resulting copolymeric product was 75 percent.

EXAMPLE II

| | Parts by weight |
|---|---|
| Water, distilled | 200.0 |
| $CF_2=CFCl$ | [1] 64.5 |
| $CF_2=CH_2$ | [1] 35.5 |
| $K_2S_2O_8$ | 1.0 |
| $Na_2S_2O_5$ | 0.4 |
| $FeSO_4 \cdot 7H_2O$ | 0.1 |

[1] 50/50 molar.

Catalyst and activator solution was prepared by dissolving 1 part of $K_2S_2O_8$ in 20 parts of water. In still another 20 parts of water, 0.1 part of $FeSO_4 \cdot 7H_2O$ was dissolved. 140 parts of water were next charged to a silver-lined steel bomb. The aforementioned $K_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. These chunks were washed with hot water to remove residual salts, and were then dried in vacuo at room temperature. The mol percent of CF₂=CFCl combined in the resulting copolymeric product was 49 percent.

The above examples illustrate the preparation of a trifluorochloroethylene-vinylidene fluoride copolymer wherein the mol ratio is 75/25 and 50/50 respectively. By varying monomer feed ratios, copolymers of different mol compositions are prepared.

The solubility of the copolymer is dependent upon the mol concentration of perfluorochloroolefin. As the concentration of perfluorochloroolefin increases the solubility decreases. For example, copolymers of trifluorochloroethylene and vinylidene fluoride which contain above 95 mol percent of trifluorochloroethylene are insoluble in the solvents of this invention. Copolymers which contain below about 95 mol percent and above about 80 mol percent are soluble in quantities ranging from about 1 percent to about 15 to 20 percent depending on the mol concentration of trifluorochloroethylene. Copolymers which contain below about 80 mol percent of trifluorochloroethylene are soluble in all proportions with the solvents of this invention. Therefore, this invention contemplates the preparation of solutions of copolymers of trifluorochloroethylene containing below about 95 mol percent of trifluorochloroethylene and preferably where a high degree of solubility is required of copolymers containing below about 80 mol percent of trifluorochloroethylene. With regard to solubility, it should be noted that while, as indicated previously, some copolymer systems are soluble in all proportions, in most instances, a minor proportion of solute is preferred. In many of the applications in which these solutions are used, high viscosities are objectionable. Usually, a concentration of between about 1 and about 20 weight percent of the copolymer is preferred. Thus, a concentration between about 1 and about 10 weight percent of copolymer is preferred when coatings are applied by a spray technique whereas a concentration between about 10 and about 20 percent is preferred when a dip technique is used. Additionally, it should be noted that copolymers which contain above about 69 and below about 80 mol percent of perfluorochloroolefin, e. g., trifluorochloroethylene copolymerized with another halogenated olefin, e. g., vinylidene fluoride have resinous characteristics whereas copolymers which contain between about 20 and about 69 mol percent of perfluorochloroolefin have elastomeric properties. Thus, by selection of a particular copolymer system, coating compositions having elastomeric or resinous properties are prepared.

The cyclic ethers which form the solvent phase of the solutions of this invention, are saturated compounds, such as dioxane, tetrahydrofuran, tetrahydro-2-methyl furan, tetrahydropyran, alpha,alpha-dimethylethylene oxide, trimethylene oxide, dioxolane, 2-methyl-1,3-dioxolane, 2,6-dimethyl-tetrahydropyran, and 2,3-dimethyl-1,4-dioxane. The preferred cyclic ethers are dioxane and tetrahydrofuran. As indicated previously, the use of at least one of the cyclic ethers is satisfactory in most instances. However, drying rate can be adjusted by blending various of the cyclic ethers. One such blend comprises an admixture of dioxane and tetrahydrofuran. Additionally, drying rate may be adjusted by adding to the cyclic ether various solvents in which the copolymer is partially soluble or even insoluble. In blending these solvents to control drying rate, preferably equal amounts by volume of each solvent constitute the mixture, although in no case should the quantity of saturated cyclic ether be less than 25 percent by volume.

The solutions of this invention are prepared by blending the solvent and the solute mechanically in equipment used in the preparation of inks, paints, etc., such as ball mills, paint mills, ribbon blenders, pony mixers, etc. Solution is also effected by mechanically agitating a mixture of the solute and solvent at elevated temperatures, i. e., temperatures up to the boiling point of the solvent at atmospheric pressures or the equivalent. Preferably, although not necessarily, the copolymer is in finely divided form since solution is effected more quickly. When prepared, these solutions may be stored at prevailing temperatures without separation of the copolymer.

The following table is presented in order to illustrate the invention. The data contained in the table shows the solubility of a copolymer of trifluorochloroethylene and vinylidene fluoride (75/25 mol ratio) in a variety of solvents. Solubility was determined by adding 10 percent of the copolymer to the indicated solvent, blending in a ball mill and noting whether or not the copolymer dissolved. In the case of solvent mixtures, equal parts by volume of each solvent was used.

*Table I*

| Solvent | Result |
| --- | --- |
| Tetrahydrofuran | Soluble. |
| Dioxane | Do. |
| Tetrahydro-2-methyl furan | Do. |
| Tetrahydropyran | Do. |
| Dioxane+Tetrahydrofuran | Do. |
| Cyclopentanone | Partially soluble—some undissolved particles. |
| Methyl ethyl Ketone | Do. |
| Isophorone | Do. |
| Di-isobutyl Ketone | Do. |
| Ethyl Methyl Ketone | Insoluble. |
| Dyphone | Do. |
| Mesityl Oxide | Slight soluble—gels. |
| Methyl ethyl Ketone+Isophorone | Partially soluble—small amount of gel. |
| Di-isobutyl Ketone+Isophorone | Do. |
| Methyl ethyl Ketone+Cyclohexanone | Do. |
| Di-isobutyl Ketone+Cyclohenanone | Do. |
| Ethyl butyl Ketone+Isophorone | Partially soluble—small amount of insoluble polymer. |
| Methyl Butyl Ketone+Cyclohexanone | Partially soluble—small amount of gel. |
| Ethyl Butyl Ketone+Methyl Ethyl Ketone | Cloudy—polymer not wetted. |
| Ethyl Butyl Ketone+Di-iso-butyl Ketone | Do. |
| Methyl ethyl Ketone+Mesityl Oxide | Partially soluble—gels. |
| Di-isobutyl Ketone+Mesityl Oxide | Do. |
| Ethyl butyl Ketone+Mesityl Oxide | Do. |
| Methyl ethyl Ketone+Mesityl Oxide + Cyclohexanone + Isophorone | Do. |
| Ethyl Acetate | Partially Soluble. |
| Ethyl Formate | Insoluble. |
| Ethyl Acetate+Ethyl Formate | Do. |
| Isoamyl Formate | Do. |
| Isobutyl Propionate | Slightly Soluble. |
| Amyl Acetate | Slightly Soluble—undissolved particles. |
| Amyl Acetate+Amyl Alcohol | Insoluble—not wetting of polymer. |
| Tetrahydrofurfuryl Acetate | Partially soluble—cloudy with undissolved particles. |
| Amyl Alcohol | Insoluble—no wetting of polymer. |
| Methyl-n-propyl Carbinol | Do. |
| Ethylene Glycol Dimethyl Ether | Insoluble. |
| Diethylene Glycol Dimethyl Ether | Do. |
| Dimethyl Formamide | Do. |
| Tetrahydrofurfuryl Alcohol | Insoluble—no wetting of polymer. |
| 1-chloro-1-nitro ethane | Partially soluble, some dry particles. |
| 1-chloro-1-nitro propane | Partially soluble—gels. |
| 2-chloro-2-nitro propane | Partially soluble—small amount of gel. |
| Nitro-methane | Insoluble—no wetting of polymer. |
| Nitro-ethane | Do. |
| Ethylene dichloride | Insoluble. |
| Propylene dichloride | Do. |
| Pentachloroethane | Insoluble—no wetting of polymer. |
| Dihydropyran | Insoluble. |
| 2,5-dimethyl furan | Insoluble—discolors. |
| Thiophene | Insoluble. |

Various alterations and modifications of the present invention will become apparent to those skilled in the art without departing from the scope of this invention.

Having thus described my invention, I claim:

1. A novel composition which comprises a copolymer containing below about 80 mol percent of a perfluorochloroethylene copolymerized with a hydrogen containing halogenated ethylene dissolved in saturated cyclic ether selected from the group consisting of tetrahydrofuran, dioxane, tetrahydro-2-methylfuran, tetrahydropyran, trimethylene oxide, alpha-alpha-dimethylene oxide, dioxolane, 2-methyl-1,3-dioxolane, 2,6-dimethyl-tetrahydrodropyran, and 2,3-dimethyl-1,4-dioxane.

2. The composition of claim 1 wherein the saturated cyclic ether is tetrahydrofuran.

3. The composition of claim 1 wherein the saturated cyclic ether is dioxane.

4. The composition of claim 1 wherein the saturated cyclic ether is tetrahydro-2-methylfuran.

5. The composition of claim 1 wherein the saturated cyclic ether is tetrahydropyran.

6. The composition of claim 1 wherein the saturated cyclic ether is trimethylene oxide.

7. The composition of claim 1 wherein the perfluorochloroethylene is trifluorochloroethylene.

8. The composition of claim 1 wherein the halogenated ethylene is vinylidene fluoride.

9. A novel composition which comprises a copolymer containing below about 80 mol percent of trifluorochloroethylene copolymerized with vinylidene fluoride dissolved in a saturated cyclic ether selected from the group consisting of tetrahydrofuran, dioxane, tetrahydro-2-methylfuran, tetrahydropyran, trimethylene oxide, alpha-alpha-dimethylene oxide, dioxolane, 2-methyl-1,3-dioxolane, 2,6-dimethyl-tetrahydropyran, and 2,3-dimethyl-1,4-dioxane.

10. A novel composition which comprises between about 1 and about 20 weight percent of a copolymer containing above about 69 and below about 80 mol percent of trifluorochloroethylene copolymerized with vinylidene fluoride dissolved in a saturated cyclic ether selected from the group consisting of tetrahydrofuran, dioxane, tetrahydro-2-methylfuran, tetrahydropyran, trimethylene oxide, alpha-alpha-dimethylene oxide, dioxolane, 2-methyl-1,3-dioxolane, 2,6-dimethyl-tetrahydropyran, and 2,3-dimethyl-1,4-dioxane.

11. A novel composition which comprises between about 1 and about 20 weight percent of a copolymer containing between about 20 and about 69 mol percent of trifluorochloroethylene copolymerized with vinylidene fluoride dissolved in a saturated cyclic ether selected from the group consisting of tetrahydrofuran, dioxane, tetrahydro-2-methylfuran, tetrahydropyran, trimethylene oxide, alpha-alpha-dimethylene oxide, dioxolane, 2-methyl-1,3-dioxolane, 2,6-dimethyl-tetrahydropyran, and 2,3-dimethyl-1,4-dioxane.

References Cited in the file of this patent

UNITED STATES PATENTS

| | | |
|---|---|---|
| 2,618,574 | Pavlic | Nov. 18, 1952 |
| 2,656,331 | Sprung | Oct. 20, 1953 |
| 2,686,770 | Dipner | Aug. 17, 1954 |
| 2,789,960 | Smith | Apr. 23, 1957 |